United States Patent
Rong

(10) Patent No.: US 10,629,341 B2
(45) Date of Patent: Apr. 21, 2020

(54) MAGNETIC PHASE COUPLING IN COMPOSITE PERMANENT MAGNET

(71) Applicant: Ford Global Technologies, LLC, Dearborn, MI (US)

(72) Inventor: C Bing Rong, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 457 days.

(21) Appl. No.: 15/243,481

(22) Filed: Aug. 22, 2016

(65) Prior Publication Data
US 2018/0053586 A1    Feb. 22, 2018

(51) Int. Cl.
| H02K 1/27 | (2006.01) |
| H01F 1/03 | (2006.01) |
| H02K 1/02 | (2006.01) |
| H01F 1/057 | (2006.01) |
| H01F 1/06 | (2006.01) |

(52) U.S. Cl.
CPC .......... *H01F 1/0306* (2013.01); *H01F 1/0315* (2013.01); *H01F 1/0579* (2013.01); *H01F 1/06* (2013.01); *H02K 1/02* (2013.01); *H02K 1/2753* (2013.01); *H02K 2213/03* (2013.01)

(58) Field of Classification Search
CPC ... H01F 1/03; H01F 1/06; H01F 1/113; H01F 1/10; H01F 1/057; H02K 1/27
See application file for complete search history.

(56) References Cited

U.S. PATENT DOCUMENTS

| 6,319,334 | B1 | 11/2001 | Ohashi et al. | |
| 9,048,016 | B2 | 6/2015 | Hu et al. | |
| 2010/0261038 | A1* | 10/2010 | Imaoka | B22F 1/02 |
| | | | | 428/800 |
| 2014/0002220 | A1* | 1/2014 | Johnson | C22C 1/02 |
| | | | | 335/302 |
| 2015/0147217 | A1* | 5/2015 | Johnson | H01F 1/0579 |
| | | | | 419/23 |

FOREIGN PATENT DOCUMENTS

| CN | 102496437 A | 6/2012 | |
| JP | WO 2016104117 A1 * | 6/2016 | ............. C23C 14/06 |

OTHER PUBLICATIONS

WO 2016104117 A1 machine translation Jul. 9, 2018.*

* cited by examiner

*Primary Examiner* — Jermele M Hollington
*Assistant Examiner* — Leda T Pham
(74) *Attorney, Agent, or Firm* — David Kelley; Brooks Kushman P.C.

(57) ABSTRACT

A composite permanent magnet comprises a first phase including a magnetically hard material and a second phase including a magnetic material. Each of the materials has an anisotropy value selected such that a ratio of the values falls within a predefined range and a resulting grain size of the magnetic material is greater than a predefined threshold defined by the predefined range.

13 Claims, 4 Drawing Sheets

US 10,629,341 B2

MAGNETIC PHASE COUPLING IN COMPOSITE PERMANENT MAGNET

TECHNICAL FIELD

The present disclosure relates to systems and methods for magnetic phase coupling in a composite permanent magnet.

BACKGROUND

Permanent magnet motors may have high efficiency, making them potentially suitable for use in traction motors for hybrid and electric vehicles. The design and choice of the permanent magnet is important in this type of motor. Rare-earth permanent magnets, such as neodymium (Nd) magnets, are often used in the traction motors in electric vehicles due to their high flux density and high anti-demagnetizing ability compared with traditional non-rare-earth magnets, such as alnico (iron alloys including aluminum, nickel, and cobalt) and ferrite. Rare-earth permanent magnets may contain a large amount of rare-earth elements, e.g., at least 30 wt % in some commercial magnets.

SUMMARY

A composite permanent magnet comprises a first phase including a magnetically hard material and a second phase including a magnetic material. Each of the materials has an anisotropy value selected such that a ratio of the values falls within a predefined range and a resulting grain size of the magnetic material is greater than a predefined threshold defined by the predefined range.

A composite material includes a matrix phase and a dispersed phase. At least one of the phases includes a magnetic material selected such that a ratio of magnetocrystalline anisotropy of the magnetic material with respect to magnetocrystalline anisotropy of the other of the phases falls within a predefined range and a resulting grain size of the magnetic material is greater than a predefined threshold defined by the predefined range.

An electrical motor includes a stator including a plurality of windings generating a magnetic field in response to receiving electrical power, and a rotor including a plurality of permanent magnets causing the rotor to travel according to attraction and repulsion forces between the magnets and the field. Each of the magnets includes a first phase including a magnetically hard material and a second phase including a magnetic material. Each of the materials has a magnetocrystalline anisotropy value selected such that a ratio of the values falls within a predefined range to define a resulting grain size of the magnetic material that is greater than 20 nanometers.

DETAILED DESCRIPTION

Figure 1:
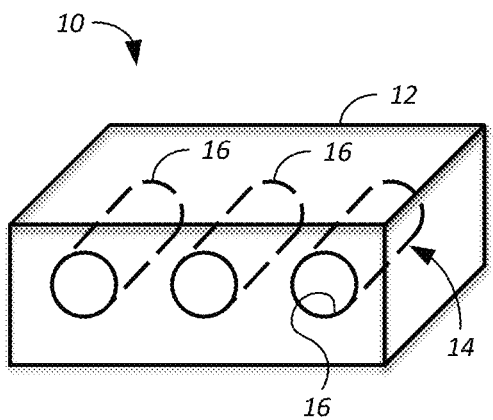
FIG. 1 illustrates a plurality of phases in a composite permanent magnet.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Magnetic properties of a given material may be defined by its microcrystalline structure, such as, for example, its electron configuration and the tendency of the electrons to align their intrinsic magnetic moments, whether spontaneously or with an application of an external magnetic field, to point in the same direction. A magnetically hard material may be a material capable of retaining magnetic properties after being magnetized, i.e., resisting demagnetization, and a magnetically soft material may be a material that tends to demagnetize relatively quickly after an external magnetic field is removed.

A permanent magnet may be a magnet that resists demagnetization when a magnetizing magnetic field is removed, i.e., exhibits retention of magnetic flux density $B_r$. Given this useful property, permanent magnets find a variety of practical applications, such as, but not limited to, design of electric motor and/or generator for a hybrid electric vehicle, electric transformer design, design and manufacture of magnetic storage, e.g., a hard drive, and so on. A permanent magnet may include a magnetically hard material. Rare-earth material alloys, such as neodymium-iron-boron (Nd—Fe—B) magnets and samarium-cobalt (Sm—Co) magnets, are examples of magnetically hard materials and may exhibit one or more of a plurality of desirable permanent magnet properties, such as a high coercivity $H_c$, high magnetic flux density B, and high energy product $(BH)_{max}$.

A permanent magnet defining a composite, or a multi-phase combination of one or more materials, may exhibit magnetic properties similar to those of the rare-earth material alloys. In one example, a composite permanent magnet may be designed to exhibit magnetic properties superior to those of magnets composed of the rare-earth material alloys alone. Constituent phases of a composite permanent magnet may be chemically similar, dissimilar, and/or may be separated by a distinct interface.

Shown in FIG. 1 is an example composite material 10, such as a composite permanent magnet. The composite material 10 may be a two-phase composite including a matrix phase 12 and a dispersed phase 14. Spatial and geometric characteristics of one or more particles 16 of the dispersed phase 14, such as, but not limited to, concentration, size, shape, distribution, and orientation, may influence the properties of the composite material 10.

The composite material 10 may be a nanocomposite, e.g., a multiphase solid material where one of the phases has one, two or three nanoscale dimensions and/or a structure having nanoscale repeat distances between the different phases that make up the material. In one instance, the nanocomposite may be a solid combination of a bulk matrix phase and one or more nano-dimensional phases differing in properties due to dissimilarities in structure and chemistry. The mechanical, electrical, thermal, optical, electrochemical, catalytic properties of the nanocomposite may differ from that of the materials comprising the matrix and dispersed phases 12, 14.

Nanocomposites may differ from conventional composite materials by having, for example, a high surface to volume ratio and/or a high aspect ratio of the dispersed phase 14. The dispersed material may be made up of particles (e.g. minerals), sheets (e.g. exfoliated clay stacks) or fibers (e.g. carbon nanotubes or electrospun fibers). An area of the interface between the matrix and dispersed phases in a nanocomposite may be an order of magnitude greater than in conventional composite materials. In one example, one or more properties of the matrix material may be affected in the vicinity of the dispersed material.

Figure 2A:
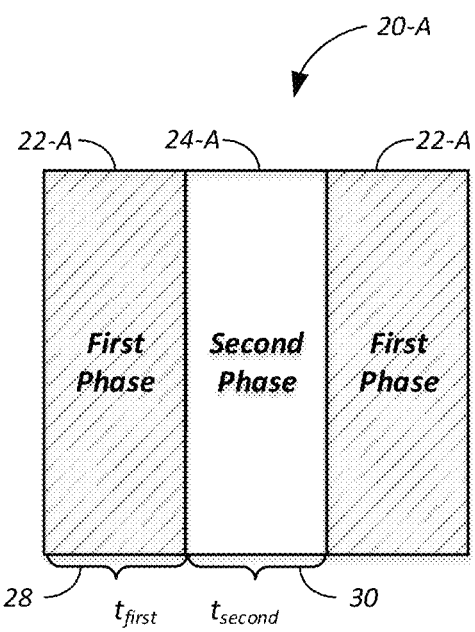
FIGS. 2A-2B illustrate example layouts of a plurality of phases in the composite permanent magnet.
Figure 2B:
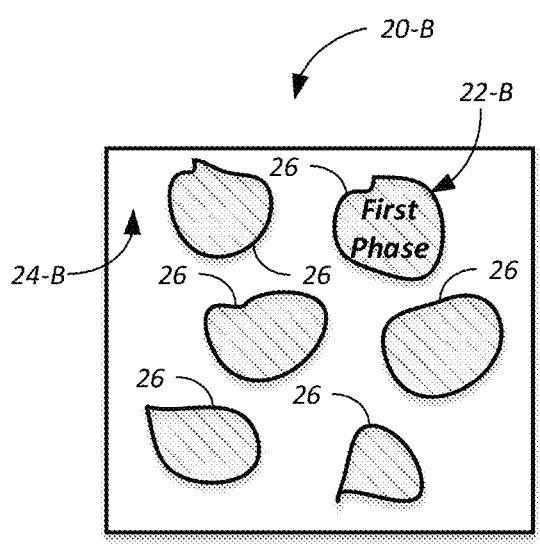

In reference to FIG. 2A, an example implementation of a multiphase composite permanent magnet 20 is shown. The composite permanent magnet 20 may include a first phase 22 and a second phase 24. The first and second phases 22, 24 may be arranged in layers, as illustrated, for example, in FIG. 2A. In some cases, as illustrated in FIG. 2B, the first phase 22 of the composite permanent magnet 20 may comprise one or more magnetic material particulates 26 dispersed in the second phase 24.

The first phase 22 may have a first grain size, e.g., first phase thickness, $t_{first}$ 28. The second phase 24 may have a second grain size, e.g., second phase thickness, $t_{second}$ 30. Under domain theory, the grain size of one or more phases of the composite permanent magnet 20 may affect magnetic properties of the material of each of the phases.

Figure 3:
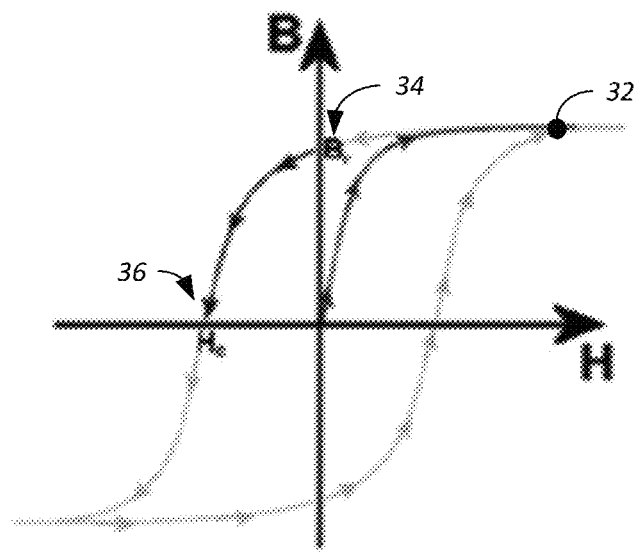
FIG. 3 illustrates an example hysteresis curve for a magnetic material.

Shown in FIG. 3 is an example hysteresis curve illustrating magnetic properties of a material. The material is magnetized using an applied external magnetic field H until it reaches its point of magnetic saturation $M_s$, illustrated, for example, using numeral 32, such that an increase in applied external magnetic field H may not result in increasing the magnetization of the material and a value of a total magnetic flux density B remains approximately the same. The material exhibits maximum residual magnetic flux (or remanence) $B_r$, illustrated, for example, using numeral 34, when an effect of an applied external magnetic field H is removed. The material exhibits maximum coercivity $H_c$, illustrated, for example, using numeral 36, when it becomes demagnetized under the influence of a reverse external magnetic field H. A maximum energy product $(BH)_{max}$ may be indicative of a maximum energy density of the material, e.g., a maximum amount of energy that may be stored in the material per unit volume. In one example, volume of a material having a larger value of the maximum energy product $(BH)_{max}$ may be smaller than volume of a material with a smaller value of the maximum energy product $(BH)_{max}$.

A given ferromagnetic or ferrimagnetic material of the composite permanent magnet 20 may exhibit its maximum coercivity $H_c$ when its grain size in a single domain range. In one example, increasing the grain size of the magnet 20, such that it divides into more than one domain, i.e., multi-domain, may cause the coercivity $H_c$ to decrease, meaning that an applied external magnetic field H required to demagnetize the material will decrease. The grain size of one or more of the phases of the composite permanent magnet 20 may affect its magnetic saturation $M_s$. A larger grain size of the material may, in one instance, require a larger external magnetic field H to align directions of a larger number of domains.

In another example, a magnetocrystalline anisotropy constant K of a given magnet may be representative of a tendency of a magnetic dipole moment of the magnet to align with an axis of an applied external magnetic field H, such as an axis having most energetically favorable direction. In still another example, the exchange stiffness constant A may be a quantity representative of a characteristic of a magnetic material, such as a strength of interaction between adjacent magnetic moments. An exemplary value for the exchange stiffness constant A in ferromagnetic metals may be $10^{-6}$ erg/cm, where erg represents a unit of energy equal to $10^{-7}$ joules (J).

Figure 4:
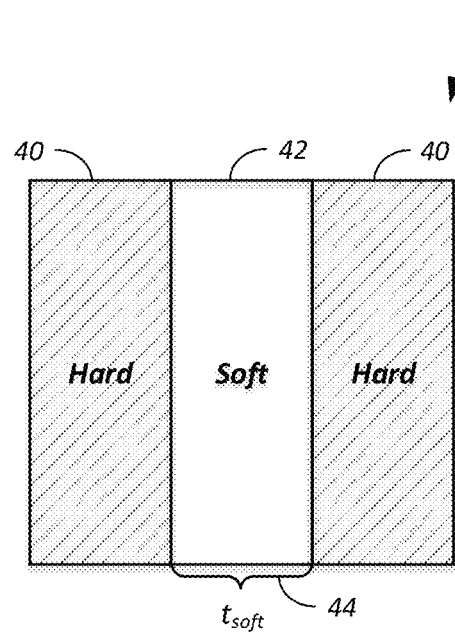
FIG. 4 illustrates a composite permanent magnet comprising a hard phase and a soft phase.

Shown in FIG. 4, is an example composite permanent magnet 38 including a magnetically hard material 40, e.g., as a first phase, and a magnetically soft material 42, e.g., as a second phase. The magnetically hard material 40 may be, for example, but not limited to, Nd—Fe—B, Sm—Co, and so on, and the magnetically soft material 42 may be, for example, but not limited to, Fe and/or Fe—Co. A combination of the magnetically hard and soft materials 40, 42 may improve remanence $B_r$ and energy product $(BH)_{max}$ of the example composite permanent magnet 38 over a non-composite permanent magnet or a composite permanent magnet combining different materials. Addition of the magnetically soft material 42 may, in some instances, lower coercivity $H_c$ of the example composite permanent magnet 38 over a permanent magnet wholly composed of the magnetically hard material. In one example, a grain size $t_{soft}$ 44 of the magnetically soft material 42 may be a predefined size, such that improved remanence Br and energy product $(BH)_{max}$ of the example composite permanent magnet 38, e.g., over those of a permanent magnet wholly composed of a magnetically hard material, are achieved without lowering its coercivity $H_c$ below a predefined value. The grain size $t_{soft}$ 44 of the magnetically soft material 42 may, in one example, be limited to approximately 10 nm.

Figure 5:
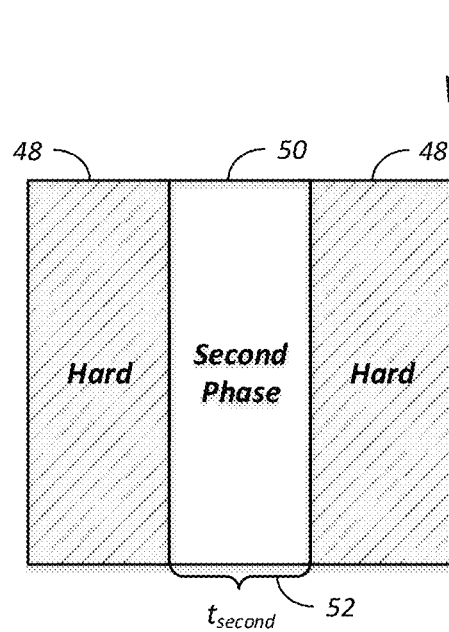
FIG. 5 illustrates a composite permanent magnet comprising a hard phase and a second phase.

Shown in FIG. 5 is an example composite permanent magnet 46 comprising a magnetically hard phase 48 and a second phase 50. The second phase 50 may define a magnetically hard, semi-hard, or another type of magnetic or nonmagnetic material. Each of the magnetically hard phase 48 and the second phase 50 may be defined by one or more extrinsic and/or intrinsic properties, such as, but not limited to, magnetocrystalline anisotropy K, saturated polarization $M_s$, and exchange constant A. In one example, exchange coupling between the magnetically hard phase 48 and the second phase 50, as defined using respective extrinsic and/or intrinsic properties of each of the phases 48, 50, may be greater than a predefined value. In another example, the composite permanent magnet 46 may comprise a third phase and a fourth phase defining a hard, semi-hard, or another type of magnetic or nonmagnetic material, such that the exchange coupling between the magnetically hard phase 48 and the second phase 50, third phase, and fourth phase, as defined using respective extrinsic and/or intrinsic properties of each of the phases, is greater than a predefined value.

The magnetically hard phase 48 may define a permanent magnet material, such as, but not limited to, Sm—Co, Nd—Fe—B, Mn—Bi, ferrite, and so on. The second phase 50 may define a single material or a combination of materials. The second phase 50 may, in one example, comprise a magnetically soft material, such as, but not limited to, Fe, Fe—Co, Co, Ni, and so on. In another example, the second phase 50 may define a magnetically semi-hard material, such as, but not limited to, Alnico, Fe—N, an L10-material, Mn—Al, Mn—Al—C, Mn—Bi, and so on. In still another example, the second phase 50 may comprise a combination of materials, such as, but not limited to, a composite of NdFeB+a-Fe(Co) with adjustable content of Fe(Co), SmCo+ Fe(Co), off-eutectoid SmCo, NdFeB alloys, and so on.

The second phase 50 may define a grain size $t_{second}$ 52 based on a relative relationship between one or more intrinsic and/or extrinsic properties of each of the phases 48, 50, thereby ensuring that the entire composite material has a predefined magnetic performance. The exchange coupling of the one or more phases of the composite permanent magnet 46 may, in one instance, be defined such that there is no observable collapse in the B-H curve and/or M-H curve associated with the magnet 46. In one example, the second phase 50 may define a grain size $t_{second}$ 52 based on a relative relationship between anisotropy K, saturated polarization $M_s$, or exchange constant A of each of the phases 48, 50.

The second phase 50 may define a grain size $t_{second}$ 52 greater than a predefined value. In one example, the grain size $t_{second}$ 52 may be much larger than a grain size of the magnetically soft material in the composite permanent magnet comprising a magnetically hard phase and a magnetically soft phase. In another example, the grain size $t_{second}$ 52 may be greater than 50 nm. In still another example, the grain size $t_{second}$ 52 may be a critical grain size.

Figure 6:
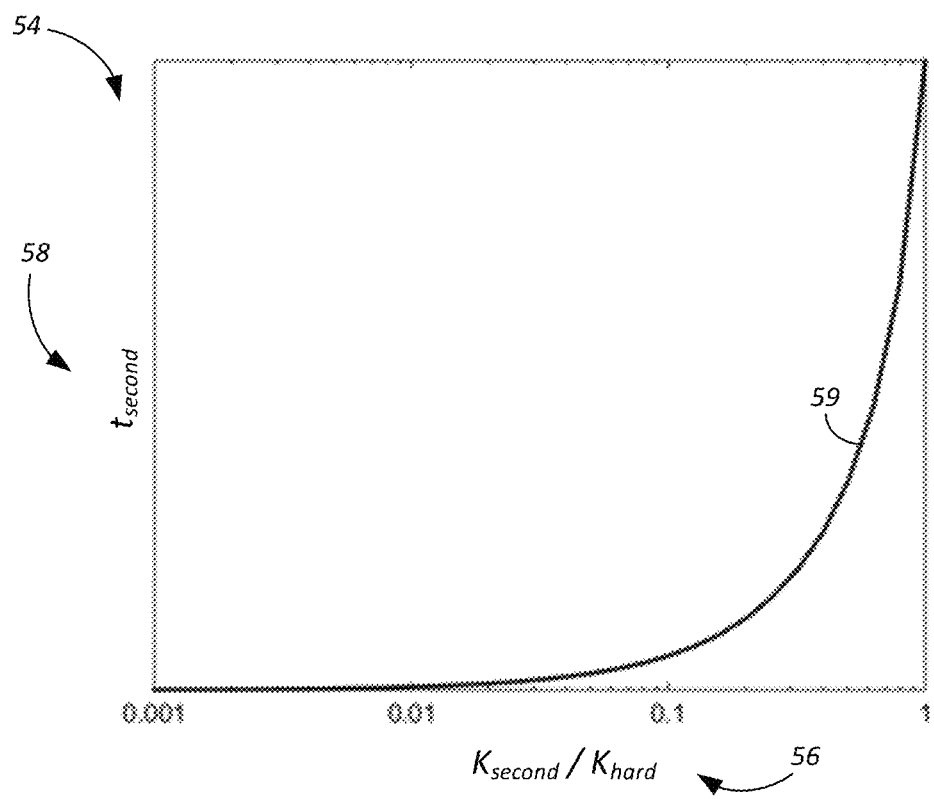
FIG. 6 illustrates a relationship between a grain size and a magnetocrystalline anisotropy ratio.

In reference to FIG. 6, a graph 54 illustrating a relative relationship between material properties of the phases 48, 50 and grain size $t_{second}$ 52 of the second phase 50 is shown. Vertical axis 58 of the graph 54 may be representative of the grain size $t_{second}$ 52 of the second phase 50. Horizontal axis 56 of the graph 54 may be representative of a ratio between magnetocrystalline anisotropy $K_{second}$ of the second phase 50 and magnetocrystalline anisotropy $K_{hard}$ of the magnetically hard phase 48. Exponential curve 59 of the graph 54 may indicate generally that grain size $t_{second}$ 52 of the second phase 50 increases with an increase in a ratio between magnetocrystalline anisotropy $K_{second}$ and magnetocrystalline anisotropy $K_{hard}$.

In one example, adjusting the material of the second phase 50 such that a ratio between magnetocrystalline anisotropy $K_{second}$ of the second phase 50 and magnetocrystalline anisotropy $K_{hard}$ of the magnetically hard phase 48 is a predefined value may result in a predefined grain size $t_{second}$ 52. In another example, a predefined grain size $t_{second}$ 52 of the second phase 50 may define a ratio between magnetocrystalline anisotropy $K_{second}$ of the second phase 50 and magnetocrystalline anisotropy $K_{hard}$ of the magnetically hard phase 48. In still another example, the adjustment of the material of the second phase 50 such that magnetocrystalline anisotropy $K_{second}$ is a predefined value may, in turn, define grain size $t_{second}$ 52 of the material of the second phase 50 to be greater than 50 nm.

Figure 7:
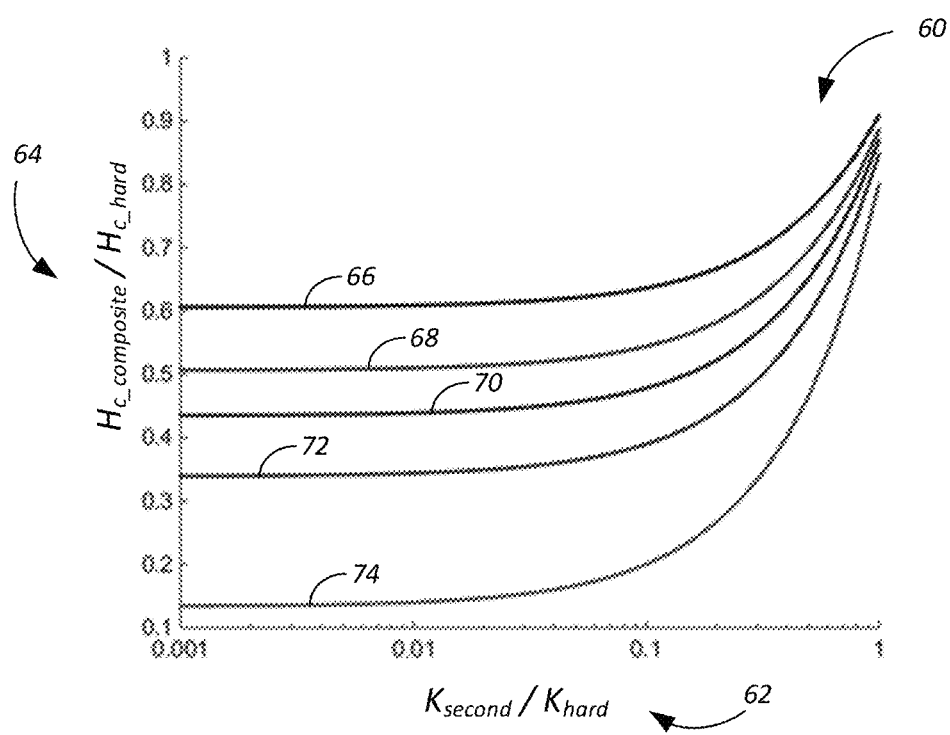
FIG. 7 illustrates a relationship between normalized coercivity and a magnetocrystalline anisotropy for varying relative grain sizes.

In reference to FIG. 7, a graph 60 illustrates an example relationship between ratios of coercivity $H_c$ and magnetocrystalline anisotropy K for various relative grain sizes t of a plurality of phases in a composite permanent magnet. Vertical axis 64 of the graph 60 may be representative of a relative relationship, e.g., a ratio, between coercivity $H_{c\_composite}$ of the composite permanent magnet 46 and coercivity $H_{c\_hard}$ of the magnetically hard phase 48 of the composite permanent magnet 46. Horizontal axis 62 of the graph 60 may be representative of a relative relationship, e.g., a ratio, between magnetocrystalline anisotropy $K_{second}$ of the second phase 50 and magnetocrystalline anisotropy $K_{hard}$ of the magnetically hard phase 48.

In one example, each of a plurality of curves 66, 68, 70, 72, and 74 may be representative of a relative relationship between coercivity $H_c$ and magnetocrystalline anisotropy K for a given proportional relationship between grain size $t_{second}$ of the second phase 50 and grain size $t_{hard}$ of the magnetically hard phase 48. Curve 66, for instance, may be representative of a relationship between ratios of coercivity $H_c$ and magnetocrystalline anisotropy K that result in a grain size ratio, such as $t_{second}/t_{hard}$, of 0.5, curve 68—a grain size ratio of 0.75, curve 70—a grain size ratio of 1, curve 72—a grain size ratio of 1.5, and curve 74—a grain size ratio of 2.

In one example, the graph 60 may indicate that an increase in grain size of the second phase 50 may result in lower coercivity $H_{c\_composite}$ of the composite permanent magnet 46, e.g., as compared to coercivity $H_{c\_hard}$ of the magnetically hard phase 48 of the composite permanent magnet 46. In another example, the graph 60 may indicate that an increase in grain size $t_{second}$ relative to grain size $t_{hard}$ beyond a predefined size, i.e., a critical size, may cause a sizeable decrease in coercivity $H_{c\_composite}$ of the composite permanent magnet 46, e.g., as in relation to coercivity $H_{c\_hard}$ of the magnetically hard phase 48, thus, weakening magnetic coupling between the phases 48, 50 as represented, for example, by B-H curve and/or M-H curve.

Figure 8:
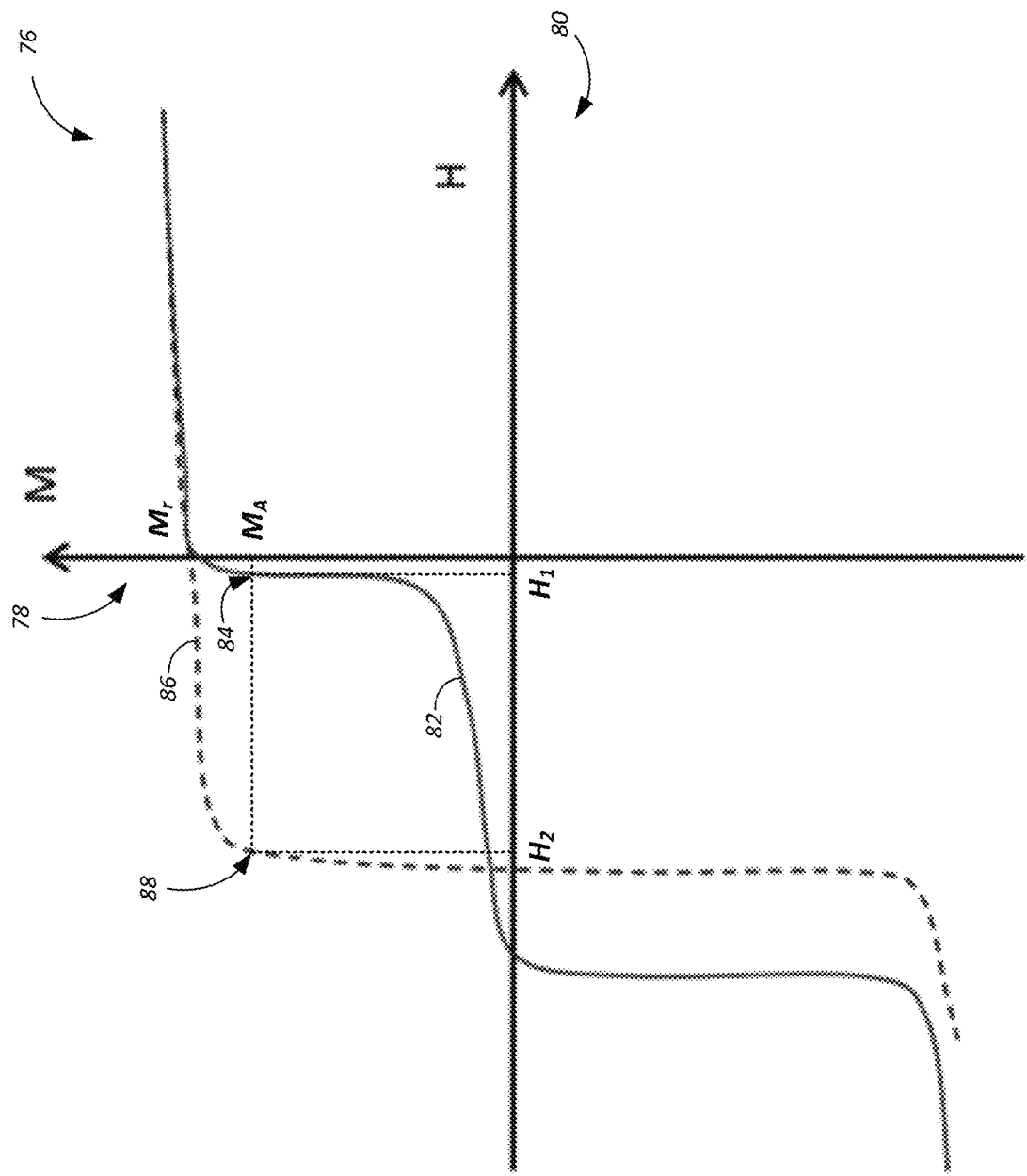
FIG. 8 illustrates demagnetization curves for a composite permanent magnet comprising a second phase defining different magnetic materials.

Shown in FIG. 8 is a graph 76 illustrating example hysteresis loops of a plurality of multiphase composite permanent magnets. Vertical axis 78 may be representative of total magnetization M of a given multiphase composite permanent magnet and horizontal axis 80 may be representative of a size of an applied magnetic field H. A curve 82 may be indicative of a hysteresis loop for a first multiphase composite permanent magnet having a first phase defining a magnetically hard material and a second phase defining a magnetically soft material. A curve 86 may be indicative of a hysteresis loop for a second multiphase composite permanent magnet having a first phase defining a magnetically hard material and a second phase defining a magnetically semi-hard material.

The curve 82, for instance, illustrates that the first multiphase permanent magnet may reach a demagnetization point $M_A$, as indicated by numeral 84, in response to the applied reverse magnetic field H having a value of $H_1$. The curve 86, for example, illustrates that the second multiphase permanent magnet may reach a same demagnetization point $M_A$, as indicated by numeral 88, in response to an applied reverse magnetic field H having a value of $H_2$, where $H_2$ is greater than $H_1$. The curve 82 may be indicative of a weaker magnetic coupling between a plurality of phases of the first multiphase composite permanent magnet than a magnetic coupling between a plurality of phases of the second multiphase composite permanent magnet.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A composite permanent magnet comprising:
a first phase including a magnetically hard material having a first anisotropy K value, and a second phase including a magnetic material having a second anisotropy K value and a resulting grain size based on an anisotropy ratio, wherein the anisotropy ratio of the second anisotropy K value to the first anisotropy K value approaches one such that the resulting grain size of the magnetic material is greater than 50 nm.

2. The magnet of claim 1, wherein each of the materials further has a coercivity value selected such that a ratio of coercivity of the permanent magnet to the coercivity of the magnetically hard material approaches one and the resulting grain size is greater than 50 nanometers.

3. The magnet of claim 1, wherein the resulting grain size is further defined by a grain size of the magnetically hard material.

4. The magnet of claim 1, wherein the magnetic material is a magnetically hard, semi-hard, or soft material.

5. The magnet of claim 1 further comprising third and fourth phases each including a magnetic material such that a respective anisotropy ratio of a respective anisotropy K value of the third and fourth phases to the first anisotropy K value approaches one and respective resulting grain sizes of the magnetic materials of the third and fourth phases are greater than 50 nanometers.

6. The magnet of claim 5, wherein each of the magnetic materials further has a coercivity selected such that a ratio of coercivity of the permanent magnet to coercivity of the magnetically hard material approaches one and the resulting grain size is greater than 50 nanometers.

7. A composite material comprising:
a matrix phase and a dispersed phase, wherein at least one of the phases includes a magnetic material selected such that a ratio of a magnetocrystalline anisotropy K value of the magnetic material with respect to a magnetocrystalline anisotropy K value of a respective other phase approaches one and a resulting grain size of the magnetic material is greater than 50 nanometers.

8. The material of claim 7, wherein the magnetic material is further selected such that a ratio of respective coercivity values of each of the phases approaches one and the resulting grain size is greater than 50 nanometers.

9. The material of claim 7, wherein the resulting grain size is further defined by a grain size of the other phase of the phases.

10. The material of claim 7, wherein the dispersed phase includes a magnetically hard material and the matrix phase includes a magnetically hard, semi-hard, or soft material.

11. An electrical motor comprising:
a stator including a plurality of windings generating a magnetic field in response to receiving electrical power; and
a rotor including a plurality of permanent magnets causing the rotor to travel according to attraction and repulsion forces between the magnets and the field, wherein each of the magnets includes a first phase including a magnetically hard material having a first anisotropy K value and a second phase including a magnetic material having a second anisotropy K value, and wherein the magnetically hard material and magnetic material are selected such that a ratio of the first anisotropy K value to the second anisotropy K value approaches one to define a resulting grain size of the magnetic material that is greater than 50 nanometers.

12. The motor of claim 11, wherein the resulting grain size is further defined by a grain size of the magnetically hard material.

13. The motor of claim 11, wherein each of the materials further has a coercivity value selected such that a ratio of the coercivity values approaches one.

* * * * *